United States Patent
Hanika et al.

(10) Patent No.: US 10,024,425 B1
(45) Date of Patent: Jul. 17, 2018

(54) AUTOMATIC TRANSMISSION SPORT AND MANUAL MODE EXTERNAL BUMP STIMULATION TO SUPPORT SHIFT EXPERIENCE

(71) Applicant: GM Global Technology Operations LLC, Detroit, MI (US)

(72) Inventors: Steffen Hanika, Rheinland-Pfalz (DE); Yaya Kaba, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/608,116

(22) Filed: May 30, 2017

(51) Int. Cl.
*A47C 31/00* (2006.01)
*F16H 61/24* (2006.01)
*G08B 1/02* (2006.01)
*B60W 10/06* (2006.01)

(52) U.S. Cl.
CPC .............. *F16H 61/24* (2013.01); *G08B 1/02* (2013.01); *B60W 10/06* (2013.01); *F16H 2061/241* (2013.01)

(58) Field of Classification Search
CPC .. G08G 1/16; G08B 23/00; A47C 7/62; A47C 31/00
See application file for complete search history.

(56) References Cited

U.S. PATENT DOCUMENTS

| | | | | |
|---|---|---|---|---|
| 5,490,713 A | * | 2/1996 | Fukuoka | A47C 3/02 297/217.1 |
| 5,533,784 A | * | 7/1996 | Fukuoka | A47C 3/02 297/217.1 |
| 6,056,357 A | * | 5/2000 | Fukuoka | B60N 2/502 297/217.3 |
| 9,004,589 B2 | * | 4/2015 | Rockwell | B60N 2/002 297/217.3 |

* cited by examiner

*Primary Examiner* — John Daniel Walters
*Assistant Examiner* — James J Triggs

(57) ABSTRACT

A transmission external bump stimulation system includes a transmission of an automobile vehicle selectively operating in a mode allowing direct vehicle operator transmission gear shifts. At least one vehicle seat is positioned in the automobile vehicle supporting a vehicle operator during operation of the automobile vehicle. A shaker device is positioned in direct contact with the seat. The shaker device produces a shock wave defining an individual pulse of mechanical energy during a gear shift of the transmission initiated by the operator during operation in the mode. The shock wave is directed toward the operator.

20 Claims, 3 Drawing Sheets

AUTOMATIC TRANSMISSION SPORT AND MANUAL MODE EXTERNAL BUMP STIMULATION TO SUPPORT SHIFT EXPERIENCE

INTRODUCTION

The present disclosure relates to automobile manual and automatic transmissions and conditions sensed by an operator during transmission shifts.

Automatic transmissions for automobile vehicles use multiple clutches which are commonly engaged on in groups of three to shift between gears, and to shift between forward and reverse. In order to make the experience of the operator as comfortable as possible, automatic transmission designs have continued to develop a substantially seamless transition or "feel" of the shifts between gears. Known automatic transmissions therefore have eliminated the short duration gear shift "bump" commonly felt by an operator in manually shifted transmissions.

For certain transmission operations, particularly for transmission operation in a sport or super-sport mode, the operator can take manual control of the shift points, for example through the use of steering wheel mounted shift paddles. The goal of these transmission operations is to provide the operator with a greater degree of engine speed control prior to initiating a shift. It is desirable to also provide the operator with an enhanced perception of the shift to coincide with sport mode operation. As noted above however, automatic transmission control systems frequently prevent a defined, short duration gear shift bump. The desired operator experience of feeling a shift while in sport mode is therefore not available. In addition, in some vehicle designs having a manual shift transmission the prime mover may not provide sufficient torque for the operator to sense a transmission shift while in sport mode.

Thus, while current automatic and manual transmissions achieve their intended purpose of delivering smooth shifts, there is a need for a new and improved system and method for providing operator shift feedback during sport mode operation.

SUMMARY

According to several aspects, a transmission external bump stimulation system includes a transmission of an automobile vehicle. A vehicle seat is positioned in the automobile vehicle supporting a vehicle operator during operation of the automobile vehicle. A shaker device is positioned in direct contact with the vehicle seat. The shaker device produces a shock wave defining an individual pulse of mechanical energy created by the shaker device during a gear shift of the transmission. The shock wave transfers the pulse of mechanical energy to the operator in the vehicle seat.

In another aspect of the present disclosure, a gear shift synchronization signal generated by a shift sensor is provided with the transmission. The gear shift synchronization signal is communicated to the shaker device to initiate production of the shock wave.

In another aspect of the present disclosure, the shift sensor generates the gear shift synchronization signal at or immediately following synchronization of a commanded gear.

In another aspect of the present disclosure, a sensor communicates an engine speed signal via a communication path to the shaker device.

In another aspect of the present disclosure, the at least one vehicle seat includes a seat bottom portion, with the shaker device positioned within the seat bottom portion.

In another aspect of the present disclosure, the at least one vehicle seat includes a seat back portion, with the shaker device positioned within the seat back portion.

In another aspect of the present disclosure, a pulse strength adjustment device is operated by the operator to adjust a pulse strength of the shock wave.

In another aspect of the present disclosure, the shaker device is positioned below the operator and directs the shock wave upwardly toward the operator.

In another aspect of the present disclosure, the shaker device is positioned behind the operator and directs the shock wave forward toward the operator.

In another aspect of the present disclosure, a transmission manual shift device is in communication with and is selected by the operator to manually change an operating gear of the transmission.

According to several aspects, a transmission external bump stimulation system includes a transmission of an automobile vehicle selectively operating in a mode allowing direct vehicle operator transmission gear shifts. At least one vehicle seat is positioned in the automobile vehicle supporting a vehicle operator during operation of the automobile vehicle. A shaker device is positioned in direct contact with the seat. The shaker device produces a shock wave defining an individual pulse of mechanical energy during a gear shift of the transmission initiated by the operator during operation in the mode. The shock wave is directed upwardly toward the operator.

In another aspect of the present disclosure, each of an engine speed sensor and a shift sensor is in communication with the shaker device.

In another aspect of the present disclosure, an engine speed signal generated by the engine speed sensor at a peak of an engine speed occurring during the gear shift initiates operation of the shaker device.

In another aspect of the present disclosure, the transmission defines an automatic transmission.

In another aspect of the present disclosure, the transmission defines a manual shift transmission.

In another aspect of the present disclosure, the at least one vehicle seat includes a seat bottom portion, with the shaker device positioned within the seat bottom portion.

In another aspect of the present disclosure, the at least one vehicle seat includes a seat back portion, with the shaker device positioned within the seat back portion.

According to several aspects, a transmission external bump stimulation system includes an automatic transmission of an automobile vehicle selectively operating in a sport mode allowing direct vehicle transmission gear shifts selected by an operator of the automobile vehicle. Multiple vehicle seats positioned in the automobile vehicle each have a seat bottom portion to support the vehicle operator and at least one passenger during operation of the automobile vehicle. A shaker device is positioned in direct contact with the seat bottom portion of each of the vehicle seats. The shaker device produces a shock wave defining an individual pulse of mechanical energy during an operator selected gear shift of the automatic transmission occurring in the sport mode. Operation in the sport mode is selected by the vehicle operator, and an intensity of the shock wave is selected by the vehicle operator.

In another aspect of the present disclosure, the shaker device produces the shock wave at a point of operation during the gear shift when a clutch is open, when a transmission speed is at a low point.

In another aspect of the present disclosure, the shaker device produces the shock wave at a point of operation during the gear shift when a clutch is closed, and when a transmission speed and an engine speed converge.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
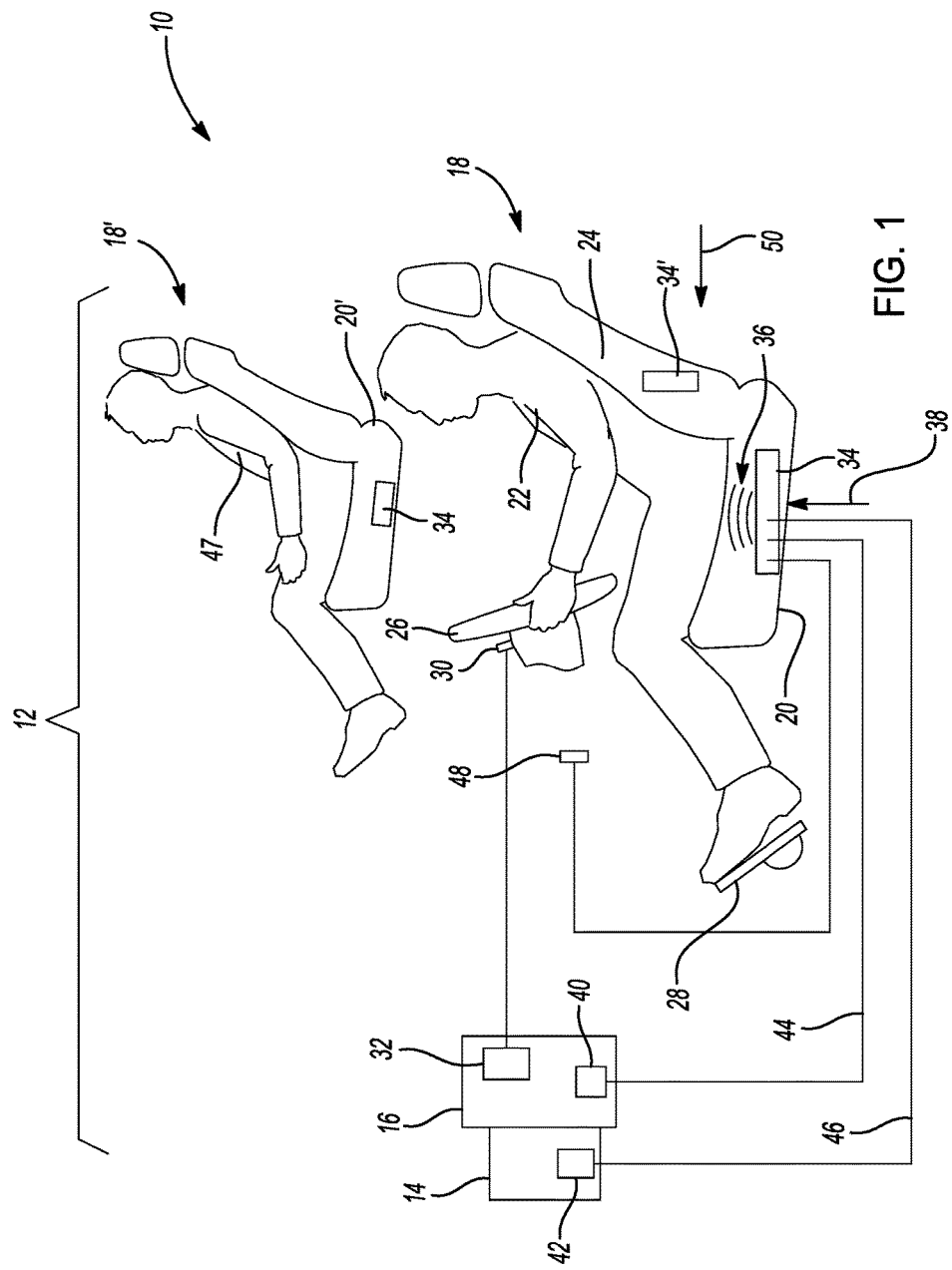
FIG. 1 is a flow diagram of a transmission external bump stimulation system according to an exemplary embodiment.

Referring to FIG. 1, a transmission external bump stimulation system 10 is provided in an automobile vehicle 12 having a prime mover 14 such as a gasoline reciprocating engine providing drive torque to an automatic transmission 16. The automobile vehicle 12 includes a seat 18 having a seat bottom portion 20 which directly supports an operator 22 during vehicle operation, and further includes a seat back portion 24 providing front-to-back positioning support for the operator 22. By adjusting the seat back portion 24 the operator has access to a steering wheel 26 and at least one pedal 28 such as a throttle control pedal. According to several aspects, a transmission manual shift device 30, or paddle shifter, may be provided on or near the steering wheel 26 providing the operator 22 with the capability to manually change an operating gear of the transmission 16. Operation of the manual shift device 30 is commonly provided by operator selection of an enhanced transmission operation or "sport mode", wherein transmission shift points and engine speed can be manually controlled by the operator 22 within predetermined allowable limits in a transmission controller 32. The manual shift device 30 communicates operator selected shift commands to the transmission controller 32.

According to several aspects, a shaker device 34 is therefore positioned in the seat bottom portion 20, which generates an individual shock wave 36 in an upward direction 38 such that the shock wave 36 is transferred directly via the seat bottom portion 20 to and sensed by the operator 22. The shock wave 36 therefore simulates to the operator 22 the sensation of a gear shift normally felt during a gear shift of a manual transmission and with a high torque producing prime mover 14. The shaker device 34 receives information concerning transmission shifts and engine operating information. The shaker device 34 is therefore in communication with at least one sensor 40 in the transmission 16, and also in communication with at least one sensor 42 in the prime mover 14. According to several aspects, the sensor 40 communicates a gear shift synchronization signal 44 via a communication path to the shaker device 34 when a gear shift synchronization occurs. According to further aspects, the sensor 42 may communicate an engine speed signal 46 via a communication path to the shaker device 34. According to further aspects, a second one of the shaker devices 34' can be provided in a seat bottom portion 20' of a passenger seat 18' of the automobile vehicle 12 to provide a similar shift sensation to a vehicle passenger 47.

According to further aspects, the shock wave 36 defines an individual pulse of mechanical energy created by the shaker device 34 when the signal indicating a transmission gear shift occurs in response to manual operation of the manual shift device 30, and when the operator 22 has pre-selected the transmission sport mode of transmission operation. An intensity or pulse strength of the shock wave 36 can be tuned or adjusted by the operator 22 to suit the individual preference of the pulse intensity desired. A pulse strength adjustment device 48 such as a rotary dial or a touch screen having multiple settings can be provided local to the operator 22 for this purpose. The pulse strength adjustment device 48 communicates operator selected pulse strength command signals to the shaker device 34. According to further aspects, operation of the shaker device can be selected for all operating modes of the transmission 16, such that the operator 22 will receive the shock wave 36 for every gear shift of the transmission 16.

According to further aspects, a shaker device 34' may also be positioned in the seat back portion 24 in addition to, or in lieu of the shaker device 34 positioned in the seat bottom portion 20. The shaker device 34' operates similar to the shaker device 34, however with its shock wave directed in a forward direction 50, i.e., with the shock wave directed toward a lower back region of the operator, and is therefore not further described in detail herein.

Referring to FIG. 2 and again to FIG. 1, a graph 52 depicts an exemplary application of the initiation of a shaker device of the present disclosure during a transmission shift event. The graph 52 depicts a relative energy level 54 over a period of time 56, and against a range of engine speeds 58. An established or selected gear 60 is changed at approximately 1.2 seconds by a commanded gear 62. As the commanded gear 62 synchronizes, at a point 64 a transmission speed 66 begins to drop significantly and deviates from an engine speed 68. When the transmission (clutch) speed reaches a low point 70 (in this example at approximately 3500 rpm), the clutch is open. At this time a signal can be sent to a shaker device of the present disclosure, similar to shaker device 34, to initiate a shock wave 72.

At a time following the low point 70, the transmission speed 66 and the engine speed 68 again converge at a point 74. According to several embodiments, the initiation signal sent to the shaker device to produce the shock wave 72 can be timed to shift the shock wave, shown in phantom as a shock wave 72', to the right as viewed in FIG. 2 such that the shock wave 72' is generated at any point within a range 75 from the point 70 up to and including at the point 74 of convergence of the transmission speed 66 and the engine speed 68. The initiation point or desired point of operation of the shaker device 34 can therefore be shifted at the discretion of the manufacturer, which allows further control of when the shock wave 72, 72' is felt by the operator 22 and the passenger 47.

Figure 2:
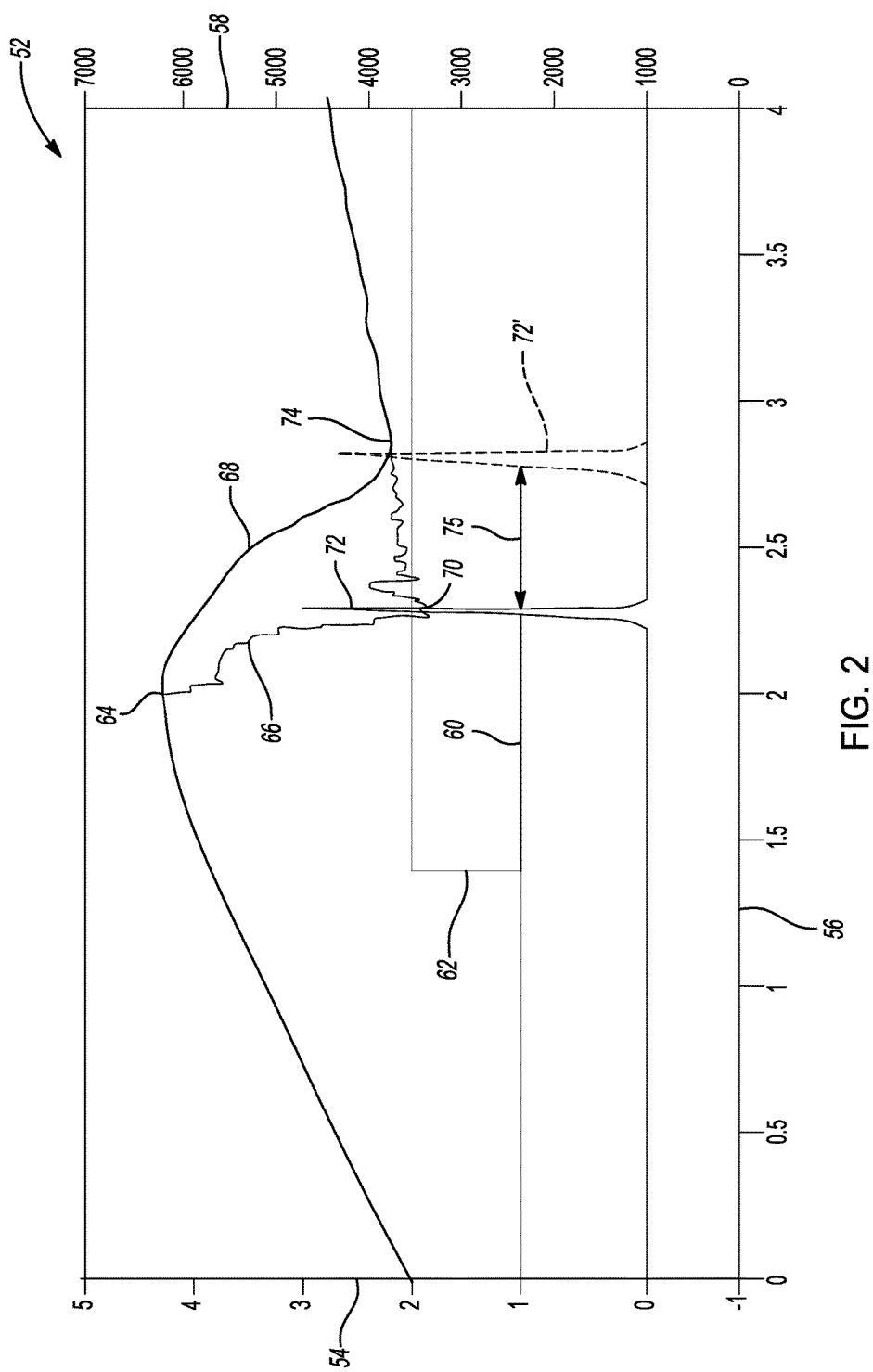
FIG. 2 is a graph depicting a single pulse from a shaker device of the present disclosure occurring during an exemplary single gear shift.
Figure 3:
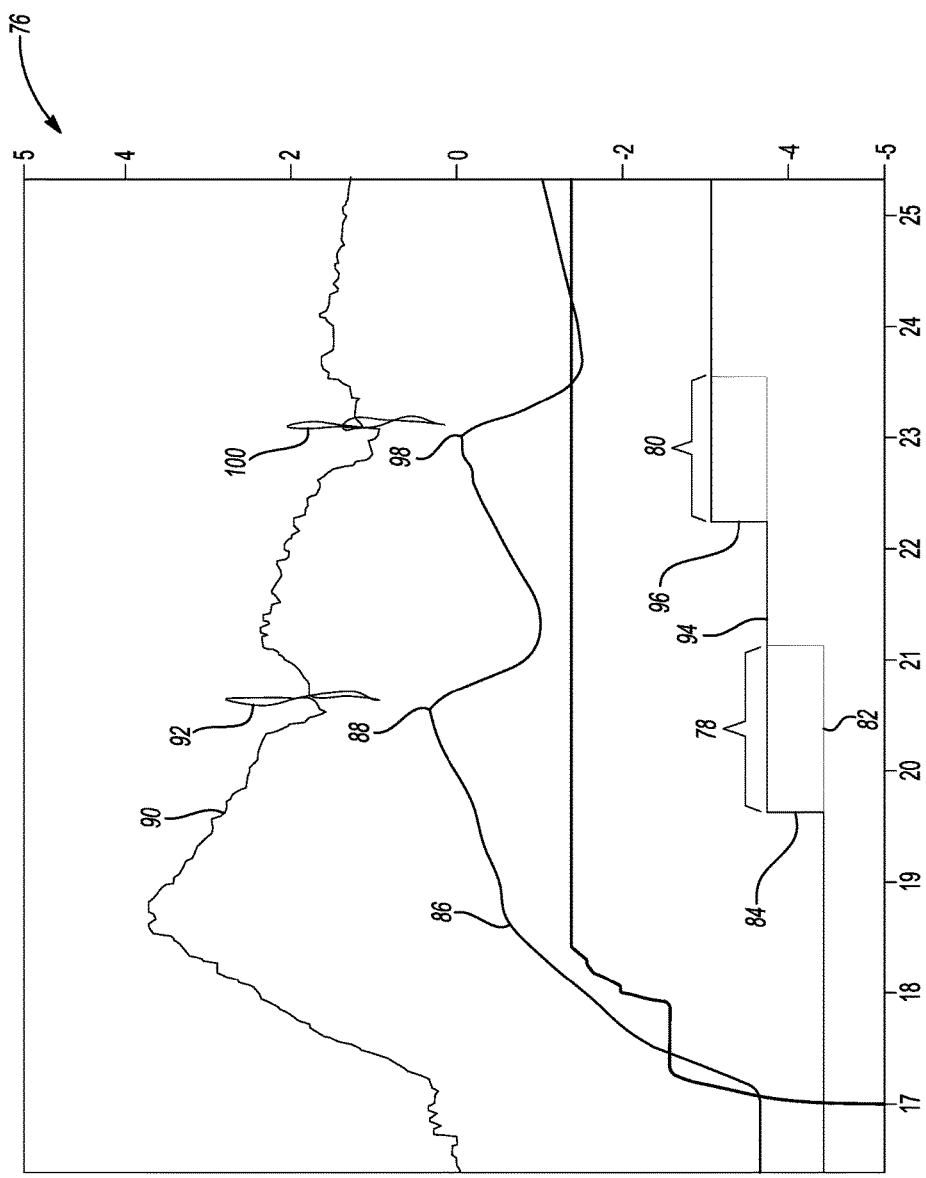
FIG. 3 is a graph depicting acceleration levels from a shaker device of the present disclosure occurring during multiple successive gear shifts.

Referring to FIG. 3 and again to FIG. 2, a graph 76 presents similar data as graph 52, representing a first shift 78 and a second shift 80. During the first shift 78, an established or selected gear 82 is changed at a time of approximately 19.5 seconds by a commanded gear 84. During the first shift 78 an engine speed 86 peaks at a first point 88 during the first shift synchronization. Through the initiation of a shaker device of the present disclosure, a clearly defined first peak event 92 of an acceleration signal 90 occurs approximately at or immediately following the first point 88.

During the second shift 80, an established or selected next gear 94 is changed at a time of approximately 22.2 seconds by a second commanded gear 96. The engine speed 86 peaks at a second point 98, lower than the first point 88, during the shift synchronization to the next gear. A clearly defined second peak event 100 of the acceleration signal 90 occurs approximately at or immediately following the second point 98.

A transmission external bump stimulation system 10 of the present disclosure offers several advantages. These include the ability to simulate the experience of a manual shift transmission to a vehicle operator while operating in a sport mode of an automatic transmission. A shaker device of the present disclosure generates a singular and distinct pulse of mechanical energy which is transferred to an operator of the vehicle which simulates the "bump" which occurs during a normal manual transmission gear change. The operator can adjust or vary the intensity of the pulse of energy from the shaker device to an individual preference. The shaker device of the present disclosure is positioned directly within the seat, for example within a cushion of the seat bottom portion preferably, and directs the pulse upwardly to the vehicle operator when a signal is received in the shaker device of a shift synchronization.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A transmission external bump stimulation system, comprising:
    an automobile vehicle having a transmission;
    a vehicle seat positioned in the automobile vehicle supporting a vehicle operator during operation of the automobile vehicle; and
    a shaker device positioned in direct contact with the vehicle seat, the shaker device producing a shock wave defining an individual pulse of mechanical energy during a gear shift of the transmission, the shock wave transferring the pulse of mechanical energy to the operator in the vehicle seat.

2. The transmission external bump stimulation system of claim 1, further including a gear shift synchronization signal generated by a shift sensor provided with the transmission, the gear shift synchronization signal communicated to the shaker device to initiate production of the shock wave.

3. The transmission external bump stimulation system of claim 2, wherein the shift sensor generates the gear shift synchronization signal at or immediately following synchronization of a commanded gear.

4. The transmission external bump stimulation system of claim 2, further including a sensor communicating an engine speed signal via a communication path to the shaker device.

5. The transmission external bump stimulation system of claim 1, wherein the at least one vehicle seat includes a seat bottom portion, the shaker device positioned within the seat bottom portion.

6. The transmission external bump stimulation system of claim 1, wherein the at least one vehicle seat includes a seat back portion, the shaker device positioned within the seat back portion.

7. The transmission external bump stimulation system of claim 1, further including a pulse strength adjustment device operated by the operator to adjust a pulse strength of the shock wave.

8. The transmission external bump stimulation system of claim 1, wherein the shaker device is positioned below the operator and directs the shock wave upwardly toward the operator.

9. The transmission external bump stimulation system of claim 1, wherein the shaker device is positioned behind the operator and directs the shock wave forward toward the operator.

10. The transmission external bump stimulation system of claim 1, further including a transmission manual shift device in communication with and selected by the operator to manually change an operating gear of the transmission.

11. A transmission external bump stimulation system, comprising:
    a transmission of an automobile vehicle selectively operating in a mode allowing direct vehicle operator transmission gear shifts;
    at least one vehicle seat positioned in the automobile vehicle supporting a vehicle operator during operation of the automobile vehicle; and
    a shaker device positioned in direct contact with the seat, the shaker device producing a shock wave defining an individual pulse of mechanical energy during a gear shift of the transmission initiated by the operator during operation in the mode, the shock wave directed toward the operator.

12. The transmission external bump stimulation system of claim 11, further including each of an engine speed sensor and a shift sensor in communication with the shaker device.

13. The transmission external bump stimulation system of claim 12, wherein an engine speed signal generated by the engine speed sensor at a peak of an engine speed occurring during the gear shift initiates operation of the shaker device.

14. The transmission external bump stimulation system of claim 11, wherein the transmission defines an automatic transmission.

15. The transmission external bump stimulation system of claim 11, wherein the transmission defines a manual shift transmission.

16. The transmission external bump stimulation system of claim 11, wherein the at least one vehicle seat includes a seat bottom portion, the shaker device positioned within the seat bottom portion.

17. The transmission external bump stimulation system of claim 11, wherein the at least one vehicle seat includes a seat back portion, the shaker device positioned within the seat back portion.

18. A transmission external bump stimulation system, comprising:
    an automatic transmission of an automobile vehicle selectively operating in a sport mode allowing direct vehicle transmission gear shifts selected by an operator of the automobile vehicle;
    multiple vehicle seats positioned in the automobile vehicle each having a seat bottom portion to support the vehicle operator and at least one passenger during operation of the automobile vehicle; and
    a shaker device positioned in direct contact with the seat bottom portion of each of the vehicle seats, the shaker device producing a shock wave defining an individual pulse of mechanical energy during an operator selected gear shift of the automatic transmission occurring in the sport mode;
wherein operation in the sport mode is selected by the vehicle operator, and an intensity of the shock wave is selected by the vehicle operator.

19. The transmission external bump stimulation system of claim 18, wherein the shaker device produces the shock wave at a point of operation during the gear shift when a clutch is open, when a transmission speed is at a low point.

20. The transmission external bump stimulation system of claim 18, wherein the shaker device produces the shock wave at a point of operation during the gear shift when a clutch is closed, and when a transmission speed and an engine speed converge.

\* \* \* \* \*